(12) United States Patent
Schorman (10) Patent No.: US 9,188,274 B2
(45) Date of Patent: Nov. 17, 2015

(54) RELEASABLE SUPPORT MOUNTS AND RELATED METHODS

(71) Applicant: Wooden Camera, Inc., Dallas, TX (US)

(72) Inventor: Ryan Reed Schorman, Dallas, TX (US)

(73) Assignee: Wooden Camera, Inc., Dallas, TX (US)

(*) Notice: Subject to any disclaimer, the term of this patent is extended or adjusted under 35 U.S.C. 154(b) by 0 days.

(21) Appl. No.: 14/218,648

(22) Filed: Mar. 18, 2014

(65) Prior Publication Data
US 2015/0267858 A1    Sep. 24, 2015

(51) Int. Cl.
*F16M 11/04* (2006.01)
*G03B 17/56* (2006.01)

(52) U.S. Cl.
CPC ........... *F16M 11/048* (2013.01); *F16M 11/041* (2013.01); *F16M 11/043* (2013.01); *G03B 17/561* (2013.01)

(58) Field of Classification Search
CPC .... G03B 17/56; G03B 17/561; G03B 17/563; G03B 17/566; F16M 11/04; F16M 11/041; F16M 11/043; F16M 11/045; F16M 11/048
USPC ................. 248/686, 688, 176.1, 177.1, 178.1, 248/187.1, 346.03, 346.04; 396/419, 425, 396/428; 348/373; 352/243; D16/242
See application file for complete search history.

(56) References Cited

U.S. PATENT DOCUMENTS

| | | | | |
|---|---|---|---|---|
| 3,429,543 | A * | 2/1969 | Mooney | 248/346.04 |
| 4,466,595 | A * | 8/1984 | O'Connor | 248/558 |
| 4,525,052 | A * | 6/1985 | Kosugi et al. | 396/419 |
| 4,570,887 | A * | 2/1986 | Banister | 248/187.1 |
| 4,979,709 | A * | 12/1990 | Ishikawa | 248/187.1 |
| 5,429,332 | A * | 7/1995 | Ishikawa | 248/187.1 |
| 7,185,862 | B1 * | 3/2007 | Yang | 248/187.1 |
| 7,431,247 | B2 * | 10/2008 | Bobro | 248/178.1 |
| 7,643,748 | B2 * | 1/2010 | Cameron et al. | 396/325 |
| 8,794,575 | B2 * | 8/2014 | Vogt | 248/177.1 |
| 2011/0042535 | A1* | 2/2011 | Cheng | 248/298.1 |
| 2013/0256484 | A1* | 10/2013 | Kessler et al. | 248/224.7 |

OTHER PUBLICATIONS

Arriflex 435 Advanced Instruction Manual, Nov. 2011, 156 pages.

* cited by examiner

*Primary Examiner* — Jonathan Liu
*Assistant Examiner* — Guang H Guan
(74) *Attorney, Agent, or Firm* — Fish & Richardson P.C.

(57) ABSTRACT

A mounting apparatus for releasably securing a device to an auxiliary structure includes a first plate and a second plate formed to engage the first plate. The first plate includes one or more features that allow attachment of the device to the first plate, and a first lateral edge extending at least partially between a front edge and a rear edge of the first plate. The second plate includes a second lateral edge extending at least partially between a front edge and a rear edge of the second plate and formed to engage the first lateral edge of the first plate, a first stopper disposed along the front edge of the second plate, and a second stopper disposed along the rear edge of the second plate. The first plate is configured to be engaged with the second plate in a frontal position and in a rearward position.

31 Claims, 9 Drawing Sheets

RELEASABLE SUPPORT MOUNTS AND RELATED METHODS

TECHNICAL FIELD

This disclosure relates to releasable support mounts, such as quick release plates used for securing cameras or other devices to auxiliary structures and releasing cameras or other devices from auxiliary structures, and related methods.

BACKGROUND

Cameras and other video equipment devices (e.g., video recorders and sound recorders) may be attached to various auxiliary structures (e.g., tripods, shoulder rigs, bridge plates, base plates, dollies, sliders, stabilizers, dovetails, and other accessory components) for photographing and filming. Securing a camera or another device to an auxiliary structure or removing the camera or other device from the auxiliary structure using conventional mounting systems may be relatively time consuming in fast pace photography and filming environments. Such an installation or removal of the camera or other device may also be cumbersome due to the extent of movement required for the installation or removal or due to the arrangement of other accessories within the vicinity of the camera or other device.

SUMMARY

In one aspect, a mounting apparatus for releasably securing a device to an auxiliary structure includes a first plate and a second plate formed to engage the first plate. The first plate includes one or more features that allow attachment of the device to the first plate, and a first lateral edge extending at least partially between a front edge and a rear edge of the first plate. The second plate includes a second lateral edge extending at least partially between a front edge and a rear edge of the second plate and formed to engage the first lateral edge of the first plate, a first stopper disposed along the front edge of the second plate, and a second stopper disposed along the rear edge of the second plate. The first plate is configured to be engaged with the second plate in a frontal position, for allowing an end of the first lateral edge to be aligned with an end of the second lateral edge and for allowing the frontal stopper to prevent frontal movement of the first plate relative to the second plate. The first plate is configured to be engaged with the second plate in a rearward position, for allowing the rearward stopper to prevent rearward movement of the first plate relative to the second plate.

In another aspect, a mounting apparatus for releasably securing a device to an auxiliary structure includes a first plate means for attaching the device to the mounting apparatus and a second plate means for engaging the first plate means. The first plate means includes a first lateral means extending at least partially between a frontal portion and a rearward portion of the first plate means. The second plate means includes a second lateral means for engaging the first lateral means of the first plate means, the second lateral means extending at least partially between a frontal portion and a rearward portion of the second plate means, a first stopper means disposed along the frontal portion of the second plate means, and a second stopper means disposed along the rearward portion of the second plate means. The first plate means is configured to be engaged with the second plate means in a frontal position, for allowing an end of the first lateral means to be aligned with an end of the second lateral means and for allowing the frontal stopper means to prevent frontal movement of the first plate means relative to the second plate means. The first plate means is configured to be engaged with the second plate means in a rearward position, for allowing the rearward stopper means to prevent rearward movement of the first plate means relative to the second plate means In another aspect, a method of removing a device from an auxiliary structure includes unlocking a first plate from a second plate, the first plate attached to the device and including a first lateral edge, the second plate coupled to the auxiliary structure and including a second lateral edge, and moving a first stopper from a first position that prevents movement of the first plate relative to the second plate, to a second position that allows movement of the first plate relative to the second plate. The method further includes moving the first plate relative to the second plate such that an end of the first lateral edge becomes misaligned from an end of the second lateral edge, and lifting the first plate from the second plate such that the device, attached to the first plate, is decoupled from the auxiliary structure, coupled to the second plate.

In some embodiments, the one or more features include holes and recesses.

In certain embodiments, the first lateral edge includes a first set of teeth and a first set of depressions, and the second lateral edge includes a second set of teeth and a second set of depressions.

In some embodiments, in the frontal position, the first set of teeth of the first lateral edge are engaged with respective teeth of the second set of teeth of the second lateral edge, and in the rearward position, the first set of teeth of the first lateral edge are aligned with respective depressions of the second set of depressions of the second lateral edge.

In certain embodiments, the frontal stopper is a pin.

In some embodiments, the rearward stopper is a ridge.

In certain embodiments, the first plate further includes a locking mechanism configured to secure the first plate to the second plate in the frontal position.

In some embodiments, the locking mechanism is a thumb screw.

In certain embodiments, the second plate further includes a pin configured to prevent rearward movement of the first plate relative to the second plate when the first plate is engaged with the second plate in the frontal position.

In some embodiments, the pin is a spring-loaded pin.

In certain embodiments, the first plate further includes a frontal groove formed to engage the frontal stopper of the second plate.

In some embodiments, the first plate further includes a rearward groove formed to engage the rearward stopper of the second plate.

In certain embodiments, the first and second lateral edges are formed as toothed edges that together form a quick-release mechanism.

In some embodiments, the first plate is securable to a dovetail structure.

In certain embodiments, the dovetail structure is an Arnold & Richter Cine Technik (ARRI) style dovetail structure.

In some embodiments, the mounting apparatus further includes a third plate that is attachable to the second plate, the third plate including one or more features that allow the third plate to be attached to the auxiliary structure.

In certain embodiments, the device is a camera, a video recorder, or a sound recorder.

In some embodiments, the auxiliary structure is a tripod, a shoulder rig, a bridge plate, a base plate, a dolly, a slider, or a stabilizer.

In certain embodiments, the first lateral means includes a first set of teeth and a first set of depressions, and the second lateral means includes a second set of teeth and a second set of depressions.

In some embodiments, in the frontal position, the first set of teeth of the first lateral means are engaged with respective teeth of the second set of teeth of the second lateral means, and in the rearward position, the first set of teeth of the first lateral means are aligned with respective depressions of the second set of depressions of the second lateral means.

In certain embodiments, the first plate means further includes a locking means configured to secure the first plate means to the second plate means in the frontal position.

In some embodiments, the first and second lateral means are formed as toothed edges that together form a quick-release mechanism.

In certain embodiments, unlocking the first plate from the second plate includes rotating a locking mechanism.

In some embodiments, rotating the locking mechanism includes orienting the locking mechanism parallel to the first plate.

In certain embodiments, the locking mechanism is a thumb screw.

In some embodiments, the first stopper is a pin, and moving the first stopper from the first position to the second position includes depressing the first stopper or pulling the first stopper.

In certain embodiments, the pin is a spring-loaded pin.

In some embodiments, the first stopper is disposed along the second plate.

In certain embodiments, the first lateral edge includes a first set of teeth and a first set of depressions, the second lateral edge includes a second set of teeth and a second set of depressions, and moving the first plate relative to the second plate includes sliding the first plate along the second plate until the first set of teeth of the first lateral edge become respectively aligned with the second set of depressions of the second lateral edge.

In some embodiments, the first plate further includes a groove, and the second plate further includes a second stopper formed to engage the groove, wherein moving the first plate relative to the second plate includes sliding the first plate along the second plate until the groove abuts the second stopper.

In certain embodiments, the second stopper is a ridge.

In some embodiments, the first and second lateral edges are formed as toothed edges that together form a quick-release mechanism.

In certain embodiments, the device is a camera, a video recorder, or a sound recorder.

In some embodiments, moving the first plate relative to the second plate includes decoupling a camera from a matte box.

In certain embodiments, the auxiliary structure is a tripod, a shoulder rig, a bridge plate, a base plate, a dolly, a slider, or a stabilizer.

In some embodiments, the first plate is securable to a dovetail structure.

In certain embodiments, the dovetail structure is an Arnold & Richter Cine Technik (ARRI) style dovetail structure.

Particular embodiments of the subject matter described in this specification may be configured to realize one or more of the following potential advantages.

In some embodiments, the release plate may be easily and quickly secured (e.g., releasably attached) to the support base in order to secure the camera or other device (e.g., while attached to the release plate) to the auxiliary structure. The release plate may further be easily and quickly detached (e.g., released) from the auxiliary structure in such a manner that the camera or other device does not contact or damage other accessory components within the vicinity of the camera or other device while being detached.

In certain embodiments, the toothed edges of the release plate are formed to easily and quickly engage complementary features of the support base. For example, the teeth of the toothed edges have sloped (e.g., downwardly angled) profiles that allow the teeth to engage toothed edges of the support base. Similarly, each of the lateral toothed edges of the receiving plate includes three teeth formed to engage the teeth of the release plate. The teeth of the lateral edges have sloped (e.g., upwardly angled) profiles that allow the teeth to easily and quickly engage the teeth of the release plate.

In some embodiments, the releasable support mount allows a camera or other device attached to the release plate to be easily and quickly removed from an auxiliary structure (e.g., to which the support base is attached) and with less travel (e.g., translational movement of about 15 mm) as compared to conventional mounting systems.

In certain embodiments, the release plate may be secured to a component or device other than the support base of the releasable support mount. For example, the release plate may be attached to a tripod plate, shoulder rig, dolly, slider, stabilizer, or another device that include an Arnold & Richter Cine Technik (ARRI) style dovetail structure. Furthermore, the receiving plate may be attached to a component or device other than the base plate or to a different release plate. For example, the receiving plate may be attached to a tripod, bridge plate, base plate, dolly, slider, stabilizer, or other mounting system.

One of skill in the art will appreciate that the invention is not limited to the embodiments described above and is intended to cover the embodiments described in this specification as well as other embodiments that are within the spirit and scope of the specification, the drawings, and the claims set forth below.

DESCRIPTION OF DRAWINGS

Like reference numbers and designations in the various drawings indicate like elements.

DETAILED DESCRIPTION

Figure 1:
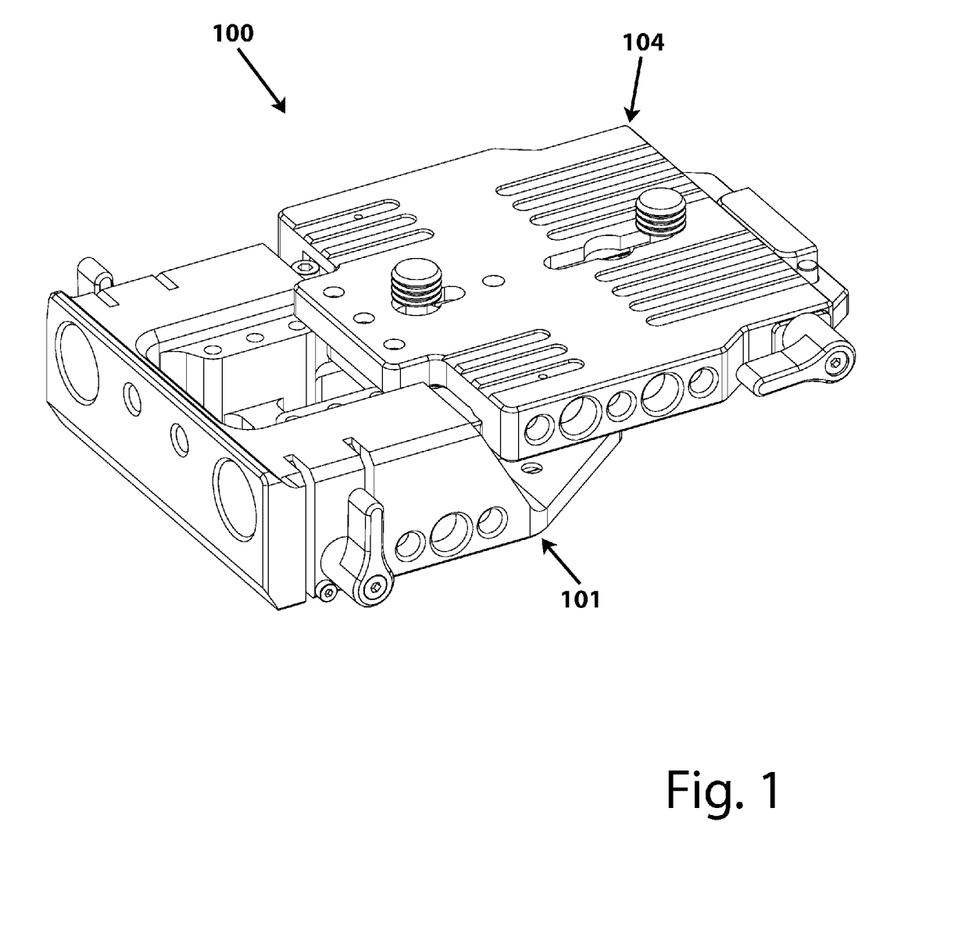
FIG. 1 is a perspective view of a releasable support mount.

FIG. 1 is a perspective view of a releasable support mount 100 (e.g., a quick-release system) that can be used for securing cameras or other devices (e.g., video recorders and sound recorders) to or releasing cameras or other devices from auxiliary structures (e.g., tripods, shoulder rigs, bridge plates, base plates, dollies, sliders, stabilizers, and dovetails). The releasable support mount 100 includes a support base 101 that may be attached to an auxiliary structure and a release plate 104 that may be attached to a camera or another device. The release plate 104 may be easily and quickly secured (e.g., releasably attached) to the support base 101 in order to secure the camera or other device (e.g., while attached to the release plate 104) to the auxiliary structure. The release plate 104 may further be easily and quickly detached (e.g., released) from the auxiliary structure in such a manner that the camera or other device does not contact or damage other accessory components within the vicinity of the camera or other device while being detached.

Figure 2:
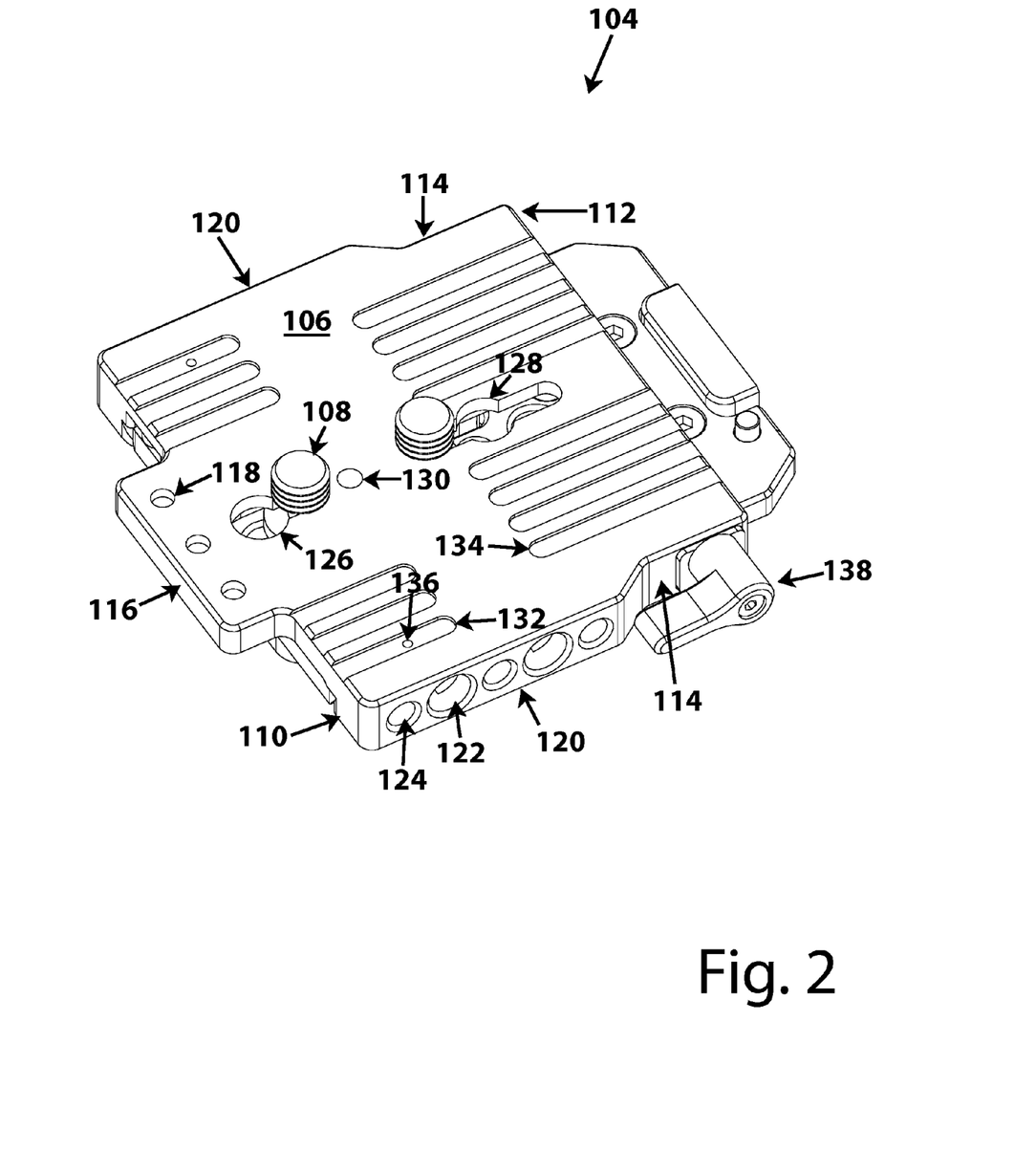
FIG. 2 is perspective view of a release plate of the releasable support mount of FIG. 1.

FIG. 2 is a perspective view of the release plate 104 as attached to a portion of the support base 101 of the releasable support mount 100. The release plate 104 includes a top surface 106, a front edge 110, a rear edge 112, and two lateral edges 114. A protrusion 116 extends along the front edge 110 of the release plate 104 and defines three holes 118 positioned along the top surface 106 of the release plate 104. The holes 118 are sized to receive screws or other fasteners for attaching accessories to the release plate 104. Two flanges 120 extend along respective lateral edges 114 of the release plate 104. Each flange 120 defines two threaded holes 122 and three threaded holes 124 that are positioned alternately adjacent each other along the lateral edge 114 of the flange 120. The threaded holes 122, 124 are sized and positioned to receive screws or other fasteners for attaching accessory components (e.g., camera cage parts or adjustable liquid crystal display (LCD) arms) to the release plate 104.

The release plate 104 further defines a single-slotted hole 126 and a double-slotted hole 128 disposed along the top surface 106 of the release plate 104. The holes 126, 128 are sized to accommodate fasteners (e.g., screws 108) and positioned to align with complimentary features (e.g., holes, fasteners, and locating pins) disposed along the surface of the camera or other device that may be attached to the release plate 104. For example, the screws 108 can be used to secure the release plate 104 to a camera or another device. The release plate 104 further defines a recess 130 (e.g., a circular recess) disposed along the top surface 106 and positioned between the holes 126, 128. The recess 130 is sized to accept a fastener or locating pin that may extend from the surface of the release plate 104 into the camera or other device. The release plate 104 further defines six elongate recesses 132 positioned along the front edge 110, eight elongate recesses 134 positioned along the rear edge 112, and two circular recesses 136 that extend from respective outer elongate recesses 132. The recesses 132, 134, 136 are sized, shaped, and positioned to engage complimentary features (e.g., camera ventilation system features and camera body contours) disposed along the surface of the camera or other device that can be attached to the release plate 104. The release plate 104 includes a locking mechanism 138 that is disposed along the left lateral edge 114 near the rear edge 112 of the release plate 104. The locking mechanism 138 may be rotated to secure the release plate 104 to the support base 101 or to release the release plate 104 from the support base 101, as will be discussed in more detail below. In the embodiment of FIG. 2, the locking mechanism 138 is formed as a thumb screw. However, in some embodiments, a release plate may include a different type of locking mechanism (e.g., a lever or other locking mechanism). Furthermore, in some embodiments, a release plate may include a locking mechanism (such as a thumb screw or another type of locking mechanism) that is located at a position different from that of the locking mechanism 138 of the release plate 104.

Figure 3:
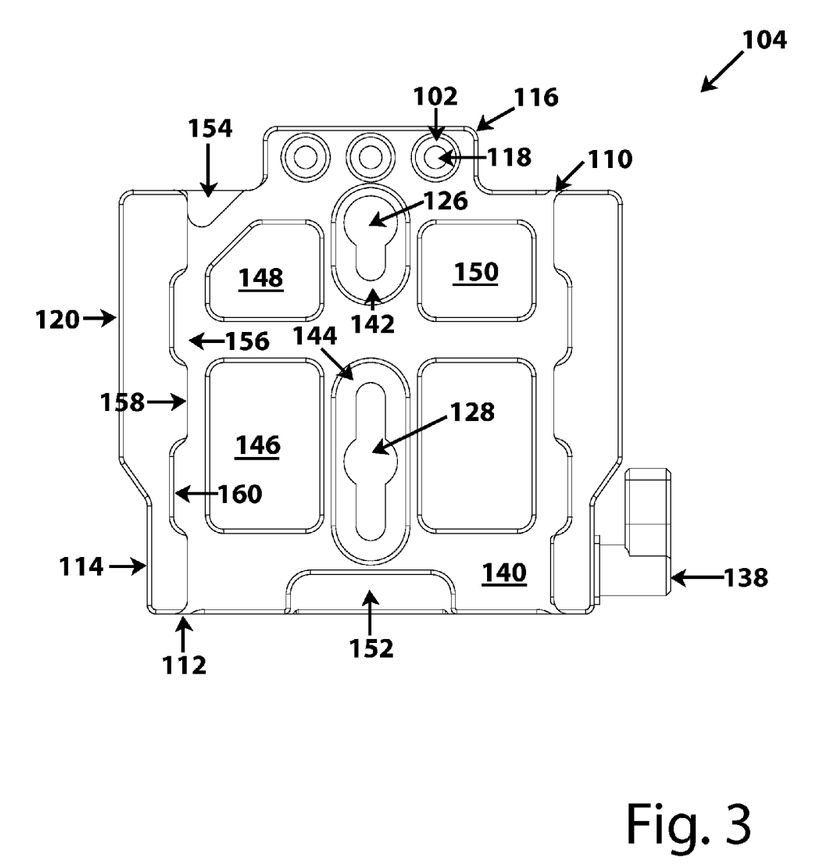
FIG. 3 is a perspective view of the bottom of the release plate of FIG. 2.

FIG. 3 is a perspective view of the bottom of the release plate 104. The release plate 104 includes a bottom surface 140 and defines three circular recesses 102 that extend from the bottom surface 140 along the protrusion 116. The recesses 102 respectively surround the holes 118. The release plate 104 further defines two elongate recesses 142, 144 that extend from the bottom surface 140 and surround the slotted holes 126, 128, respectively. The recesses 102, 142, 144 are sized, shaped, and positioned to accommodate screws or other fasteners that may be disposed within the holes 118, 126, 128, respectively, to secure the camera or other device to the release plate 104. The release plate 104 further defines two generally rectangular shaped recesses 146 that extend from the bottom surface 140 and are disposed along opposing sides of the double-slotted hole 128. The release plate 104 further defines a generally polygonal shaped recess 148 and a generally rectangular shaped recess 150 that extend from the bottom surface 140 and that are disposed along opposing sides of the single-slotted hole 126. The recesses 146, 148, 150 may be sized to reduce the weight of the release plate 104. In some embodiments, a release plate may include recesses that have shapes and sizes different from the recesses 146, 148, 150 of the release plate 104.

The release plate 104 further defines peripheral grooves 152, 154 that extend from the bottom surface 140 of the release plate 104. The groove 152 is an elongate groove that is disposed along the rear edge 112 of the release plate 104, and the groove 154 is a generally triangular shaped groove that is disposed along the front edge 110 of the release plate 104. The release plate 104 includes two toothed edges 156 (e.g., serrated or notched edges) that extend respectively along bottom sides of the flanges 120. Each toothed edge 156 includes three teeth 158 and two depressions 160 positioned alternately adjacent each other. The grooves 152, 154 and the toothed edges 156 are formed to easily and quickly engage complementary features of the support base 101. For example, the teeth 158 of the toothed edges 156 have sloped (e.g., downwardly angled) profiles that allow the teeth 158 to engage toothed edges of the support base 101, as will be discussed in more detail below.

In the example releasable support mount 100, the release plate 104 may have a length (e.g., as measured between the front and rear edges 110, 112) of about 7.5 cm and a width (e.g., as measured between the lateral edges 114 of the flanges 120) of about 0.5 cm. The release plate 104 may have a thickness (e.g., as measured between the top and bottom surfaces 106, 140) of about 1.2 cm. The flanges 120 of the release plate 104 may have a width (e.g., as measured between an outermost portion of a lateral edge 114 of the flange 120 and an innermost portion of the lateral edge 114) of about 0.5 cm. The elongate groove 152 of the release plate 104 may have a length of about 2.8 cm, a width of about 0.7 cm, and a depth of about 0.4 cm. The protrusion 116 of the release plate 104 may have a length of about 3.8 cm and a width of about 1.2 cm. The teeth 158 and the depressions 160 of the toothed edges 156 of the release plate 104 may have lengths of about 1.5 cm. In some embodiments, the release plate 104 may weigh about 0.2 lb. In a general embodiment, a releasable support mount may include a release plate that has features (e.g., edges, flanges, grooves, recesses, holes, protrusions, teeth, depressions, etc.) of dimensions, shape, number, position, and/or arrangement different from those of the release plate 104.

Figure 4:
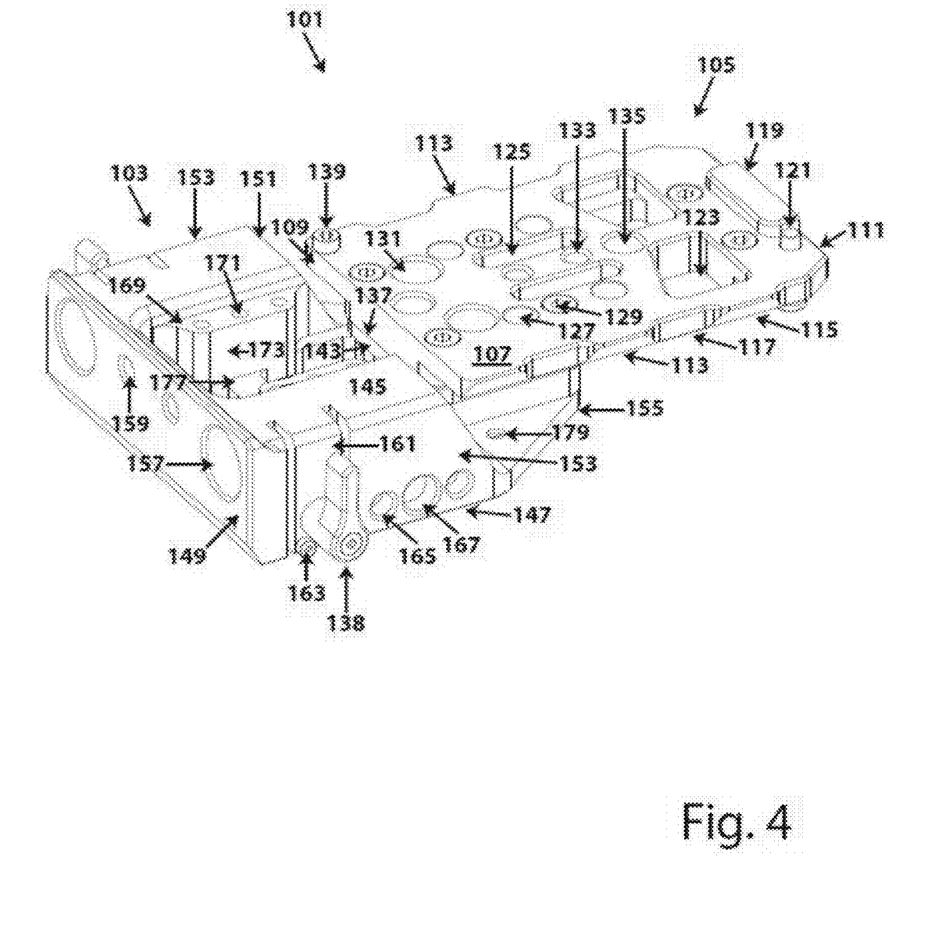
FIG. 4 is side perspective view of a support base of the releasable support mount of FIG. 1.
Figure 5:
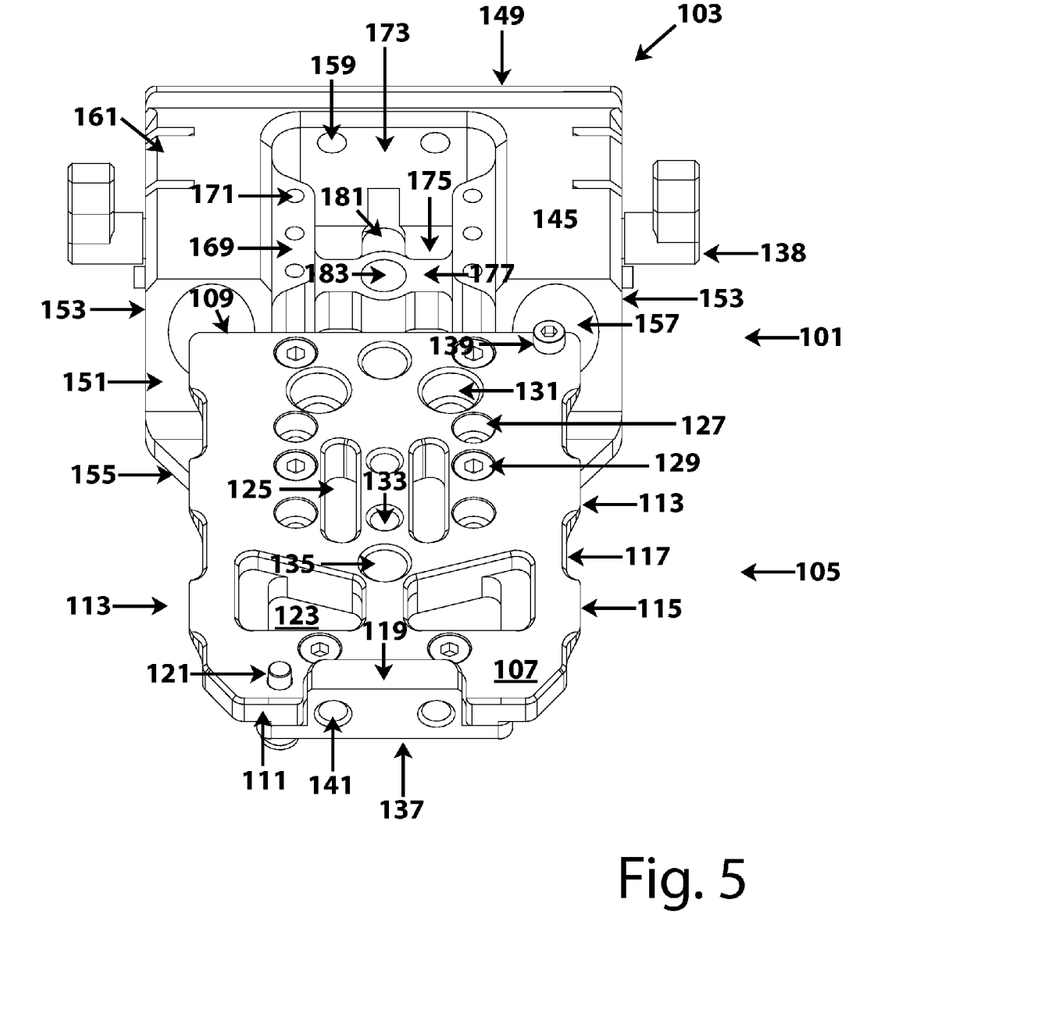
FIG. 5 is rear perspective view of the support base of FIG. 4.

FIGS. 4 and 5 are side and rear perspective views, respectively, of the support base 101. The support base 101 may be used to balance the camera or other device secured to the releasable support system 100 and may provide a structure for mounting accessory components a camera system. The support base 101 includes a base plate 103 that may be attached to an auxiliary structure (e.g., a tripod, shoulder rig, dovetail plate, bridge plate, dolly, slider, or stabilizer) and a receiving plate 105 that may be engaged with the release plate 104. The receiving plate 105 includes a top surface 107, a bottom surface 137, a front edge 109, a rear edge 111, and two lateral edges 113. The lateral edges 113 are toothed edges (e.g., serrated or notched edges) that are formed to engage the toothed edges 156 of the release plate 104. Accordingly, each of the lateral edges 113 of the receiving plate 105 includes three teeth 115 formed to engage the teeth 158 of the release plate 104 and two depressions 117 positioned alternately adjacent the teeth 115. The teeth 115 of the edges 113 have sloped (e.g., upwardly angled) profiles that allow the teeth 115 to easily and quickly engage the teeth 158 of the release plate 104.

The receiving plate 105 includes an elongate ridge 119 disposed along the rear edge 111 that is formed to engage the elongate groove 152 of the release plate 104. The receiving plate 105 further includes a pin 121 (e.g., a spring-loaded pin) that is formed and positioned to prevent movement of the release plate 104 towards the rear edge 111 of the receiving plate 105, as will be discussed in more detail below. The receiving plate 105 further includes two stepped recesses 123 and two elongate recesses 125 that extend from the top surface 107. The stepped recesses 123 have a generally trapezoidal cross-sectional shape and are positioned near the rear edge 111 of the receiving plate 105. The elongate recesses 125 are positioned along a central region of the receiving plate 105. The recesses 123, 125 may be sized to reduce the weight of the receiving plate 105. The receiving plate 105 defines ten stepped openings 127 formed to receive fastener inserts (e.g., fastener inserts 129), two stepped openings 131 formed to receive fastener inserts, two through holes 133, and two through holes 135. The through holes 133, 135 are positioned along a centerline of the receiving plate 105.

The receiving plate 105 further includes a stopping pin 139 located along the front edge 109 that is sized to fit within the peripheral groove 154 of the release plate 104 for preventing movement of the release plate 104 towards the front edge 109 of the receiving plate 105, as will be discussed in more detail below. The size and position of the stopping pin 139 may also aid in securing the release plate 104 to the receiving plate 105 such that movement of the release plate 104 relative to the receiving plate 105 is minimized. The receiving plate 105 further includes two through holes 141 (shown in FIG. 5) located along the rear edge 111 of the receiving plate 105 that are sized to accept screws or other fasteners for coupling rods, baseplates, or other accessories to the support base 101. The receiving plate 105 further includes a mount 143 (shown in FIG. 4) that is attached to the base plate 103.

In the example releasable support mount 100, the receiving plate 105 of the support base 101 may have a length (e.g., as measured between the front and rear edges 109, 111) of about 9.1 cm and a width (e.g., as measured between the teeth 115 of opposing lateral edges 113) of about 6.8 cm. The receiving plate 105 may have a thickness (e.g., as measured between the top and bottom surfaces 107, 137) of about 1.0 cm. The elongate ridge 119 of the receiving plate 105 may have a length of about 2.7 cm, a width of about 0.8 cm, and a height of about 0.4 cm. The teeth 115 and the depressions 117 of the lateral edges 113 of the receiving plate 105 may have lengths of about 1.5 cm. In some embodiments, the receiving plate 105 may weigh about 0.2 lb. In a general embodiment, a releasable support mount may include a receiving plate that has features (e.g., edges, grooves, recesses, holes, protrusions, teeth, depressions, etc.) of dimensions, shape, number, position, and/or arrangement different from those of the receiving plate 105.

Still referring to FIGS. 4 and 5, the base plate 103 includes a top surface 145, a bottom surface 147 (shown in FIG. 4), a front edge 149, a rear edge 151, and two lateral edges 153. The base plate 103 forms an interior region 173 that is defined by the top surface 145, the rear edge 151, and an interior floor 175 (shown in FIG. 5) disposed along an opposing side of the bottom surface 147. The base plate 103 further includes an extension piece 155 that extends from the rear edge 151 of the base plate. The extension piece 155 provides a structure to which the mount 143 of the receiving plate 105 can be attached. The extension piece 155 defines two openings 179 (one opening 179 shown in FIG. 4) located along respective sides of the extension piece 155. The openings 179 are sized to allow passage of fasteners for attaching the base plate 103 to an auxiliary structure.

The base plate 103 further includes two through holes 157 that extend from the front edge 149 (as shown in FIG. 4) to the rear edge 151 (as shown in FIG. 5) along respective lateral edges 153 of the base plate 103. The through holes 157 are sized to allow passage of rods (e.g., 15 mm iris support rods) for securing the support base 101 to an auxiliary structure. The base plate 103 further includes two threaded holes 159 that extend from a central region of the front edge 149 to the interior region 173 of the base plate 103. The holes 159 are sized and positioned to allow attachment of components (e.g., rosette brackets, handle bars, and additional rod supports) to the support base 101. The base plate 103 further includes two flanges 161 that extend along respective lateral edges 153 of the base plate 103. Each flange 161 extends from the top surface 145 to the bottom surface 147 of the base plate 103 along a wall that defines respective through holes 157.

The base plate 103 includes the locking mechanism 138 and two fasteners 163 (e.g., screws, shown in FIG. 4) positioned along and extending into each flange 161. The fasteners 138 may be rotated to secure the base plate 103 to an auxiliary structure or to release the base plate 103 from the auxiliary structure. For example, the locking mechanisms 138 extending through the flanges 161 may engage support rods (e.g., 15 mm iris support rods). The base plate 103 further includes two through holes 165 and a through hole 167 (shown in FIG. 4) located along each lateral edge 153 and positioned between two through holes 165. The through holes 165, 167 are sized and positioned to engage complimentary features (e.g., screws) of auxiliary components (e.g., camera cage parts or adjustable LCD arms) that may be coupled to the support base 101.

The base plate 103 further includes two interior projections 169 that extend along respective lateral edges 153 within the interior region 173 of the base plate 103 and that each defines three through holes 171. The base plate 103 further includes an elongate member 177 that extends between the interior projections 169 along the floor 175 of the interior region 173 and that defines a through hole 183. The floor 175 of the interior region 173 defines a slotted hole 181 (shown in FIG. 5). The holes 171, 179, 183 are sized to allow passage of components (e.g., screw fasteners) of an auxiliary device that may be coupled to the support base 101. The floor 175 of the interior region 173 and the extension piece 155 define additional openings (not shown) that allow passage of such components for attaching the support base 101 to an auxiliary structure.

In the example releasable support mount 100, the base plate 103 of the support base 101 may have a length (e.g., as measured between the front edge 149 and a rear edge of the extension piece 155) of about 9.3 cm and a width (e.g., as measured between the lateral edges 153) of about 8.3 cm. The base plate 103 may have a height (e.g., as measured between the top and bottom surfaces 145, 147) of about 2.8 cm. The extension piece 155 and the floor 175 of the base plate 103 may have a thickness of about 0.2 cm to about 0.5 cm (e.g., 0.5 cm). The through holes 157 may have a diameter of about 1.5 cm, and the threaded holes 159 may have a diameter of about 0.6 cm. In some embodiments, the base plate 103 may weigh about 0.2 lb. In a general embodiment, a releasable support mount may include a base plate that has features (e.g., edges, flanges, grooves, recesses, holes, protrusions, etc.) of dimensions, shape, number, position, and/or arrangement different from those of the base plate 103.

Various components of the releasable support mount 100 (e.g., the release plate 104, the base plate 103, and the receiving plate 105) may be made of one or more materials including aluminum, steel, stainless steel, and zinc. The components of the releasable support mount 100 may be coated with one or more materials including an anodized material, a hard anodized material, paint, and nickel plating. In some implementations, the components of the releasable support mount 100 may be manufactured via one or more processes including computer numerical control (CNC) machining and casting.

Figure 6:
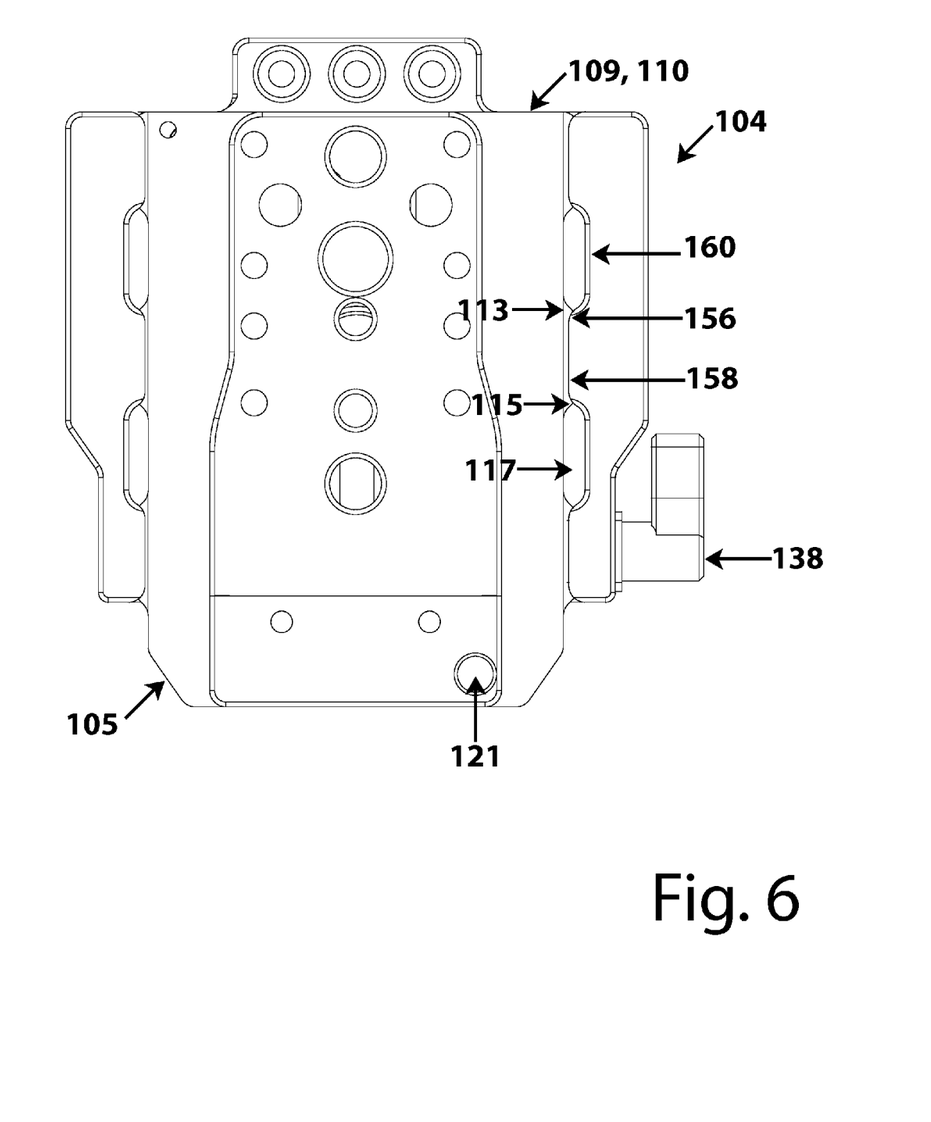
FIG. 6 is bottom perspective view of the release plate of FIG. 2 as secured to a receiving plate of the support base of FIG. 4.

FIG. 6 is bottom perspective view of the release plate 104 as secured to the receiving plate 105 of the support base 101. The camera or other device (not shown) may be secured to the release plate 104 via one or more fasteners (e.g., the screws 108 shown in FIG. 2). The release plate 104 (e.g., with the camera or device attached to it) may be attached (e.g., releasably secured) to the receiving plate 105 of the support base 101. For example, the elongate groove 152 (shown in FIG. 3) along the rear edge 112 of the release plate 104 may be aligned with the elongate ridge 119 (shown in FIGS. 4 and 5) along the rear edge 111 of the receiving plate 105. In such a position, the teeth 158 along the toothed edges 156 of the release plate 104 are approximately aligned with the depressions 117 along the lateral toothed edges 113 of the receiving plate 105. The release plate 104 may then be moved towards the receiving plate 105 such that the release plate 104 depresses the pin 121 and the teeth 158 of the release plate 104 are engaged with the depressions 117 of the receiving plate 105. The release plate 104 can then be slid over the receiving plate 105 towards the front edge 109 of the receiving plate 105 such that the teeth 158 along the toothed edges 156 of the release plate 104 engage the teeth 115 along the lateral toothed edges 113 of the receiving plate 105, as shown in FIG. 6.

The release plate 104 may be slid towards the front edge 109 of the receiving plate 105 by about 12 mm to about 15 mm (e.g., 15 mm) until the peripheral groove 154 (shown in FIG. 3) of the release plate 104 abuts the stopping pin 139 (shown in FIGS. 4 and 5) of the receiving plate 105. Following such an abutment, the release plate 104 no longer covers the pin 121, and the pin 121 moves upward through the receiving plate 105 (as shown in FIGS. 1 and 2). Such movement of the pin 121 may be accompanied by an audible sound (e.g., a click or a popping sound). The release plate 104 may be secured to the receiving plate 105 in a forward position by locking the locking mechanism 138 (e.g., by rotating the end of the locking mechanism 138 towards the front edge 110 until the locking mechanism 138 is oriented approximately parallel to the top surface 106 and the end of the locking mechanism 138 points toward the front edge 110 of the release plate 104).

Figure 7A:
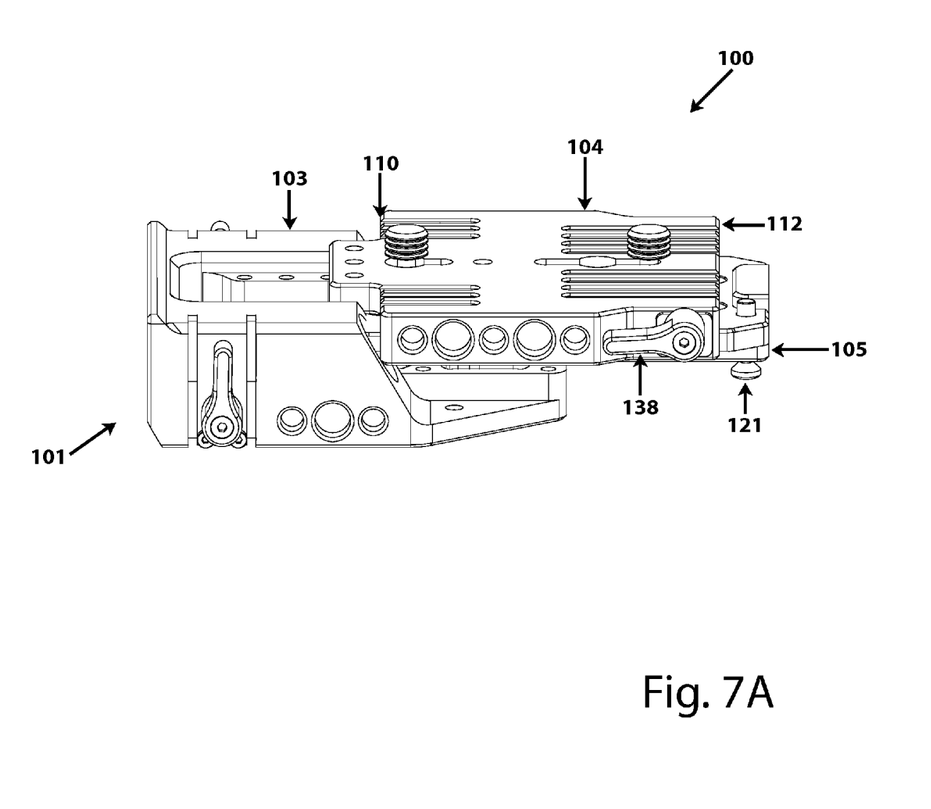
FIGS. 7A-7C illustrate a method of removing the release plate of FIG. 2 from the support base of FIG. 4.
Figure 7B:
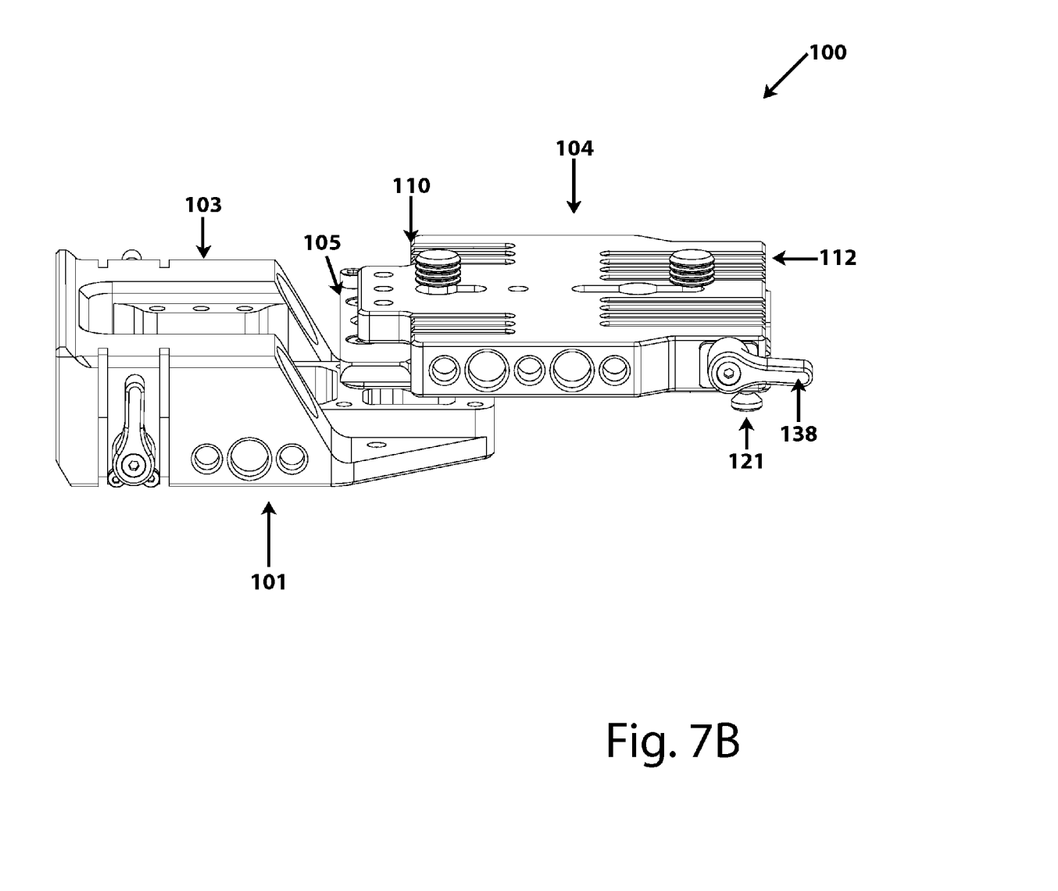
Figure 7C:
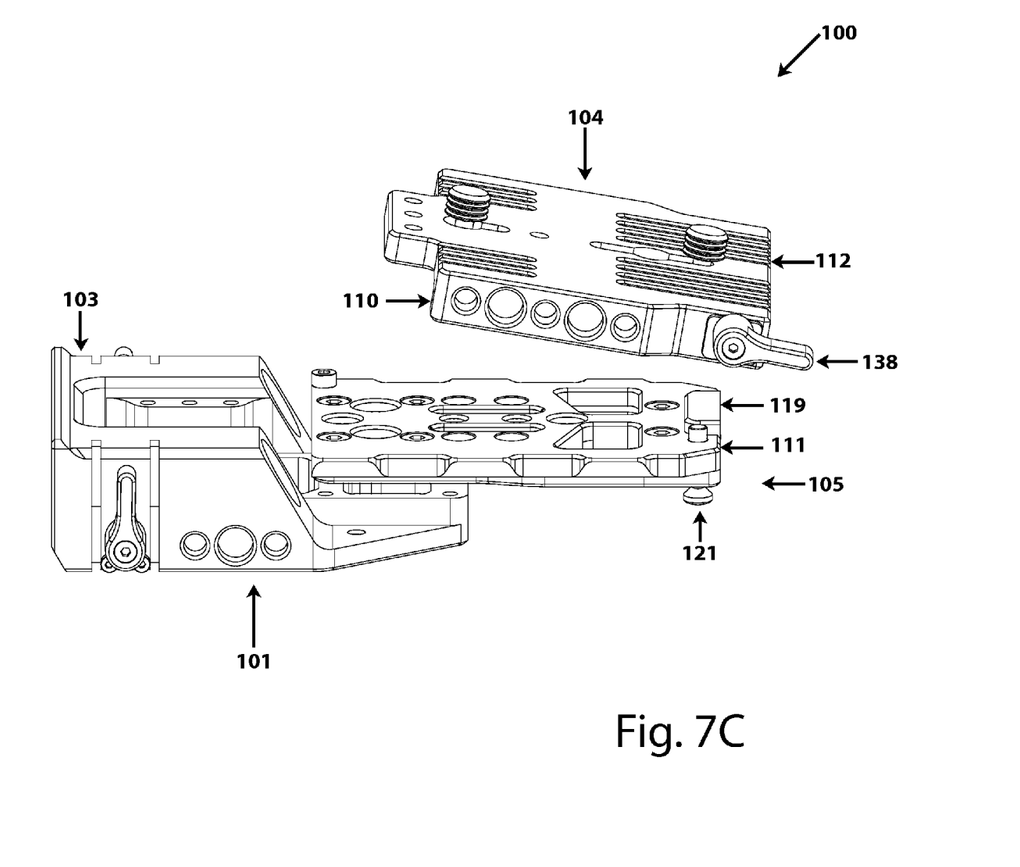

FIGS. 7A-7C illustrate a method of removing the release plate 104 from the support base 101 of the releasable support mount 100. Referring particularly to FIG. 7A and with the release plate 104 secured to the receiving plate 105 in a forward and locked position, the locking mechanism 138 may be unlocked by rotating the locking mechanism 138 approximately 180 degrees such that the end of the locking mechanism 138 points toward the rear edge 112 of the release plate 104. The pin 121 may then be pushed downward from above the release plate 104 or pulled downward from below the release plate 104 to allow rearward movement of the release plate 104. Referring particularly to FIG. 7B, the release plate 104 may then be slid towards the rear edge 111 of the receiving plate 105 by about 12 mm to about 15 mm (e.g., 15 mm) until the elongate groove 152 of the release plate 104 abuts the elongate ridge 119 of the receiving plate 105. For example, when a camera is attached to the release plate 104 of the releasable support mount 100, sliding the release plate 104 towards the rear edge 111 of the receiving plate 105 may include decoupling the camera from a matte box. Referring particularly to FIG. 7C, the release plate 104 (e.g., with the camera or other device attached to the release plate 104) may then be removed (e.g., released and/or lifted) from the receiving plate 105 of the support base 101.

According to the method illustrated in FIGS. 7A-7C, the toothed (e.g., serrated or notched) edges 113, 156 of the receiving plate 105 and the release plate 104, respectively, allow a camera or other device attached to the release plate 104 to be easily and quickly removed (e.g., decoupled or released) from an auxiliary structure (e.g., to which the support base 101 is attached) and with less travel (e.g., rearward translational movement of about 15 mm) as compared to conventional mounting systems. For example, typical translational movements of conventional mounting systems may be more than 50 mm (e.g., 80 mm), which may require rearranging components located along a front or rear edge of a camera in order to remove the camera from the auxiliary structure without the camera contacting or damaging such components and time delays associated with such rearrangements. In contrast, the receiving plate 105 and the release plate 104 of the releasable support mount 100 allows a camera to be removed from the auxiliary structure with minimal or reduced translation movement and therefore without having to rearrange such components located near the camera in order to avoid contacting or otherwise damaging the components. Such rearward movement of the camera allows a lens of the camera to be unplugged (e.g., decoupled or released) from a matte box without additional adjustment of other nearby accessories. Accordingly, the camera can be slid about 15 mm in a rearward direction and lifted directly upwards for removal.

In some implementations, the release plate 104 may be secured to a component or device other than the support base 101 of the releasable support mount 100. For example, the release plate 104 may be attached to a tripod plate, shoulder rig, dolly, slider, stabilizer, or other devices that include an Arnold & Richter Cine Technik (ARRI) style dovetail structure. Furthermore, the receiving plate 105 may be attached to a component or device other than the base plate 103 or to a release plate that is different from the release plate 104. For example, the receiving plate 105 may be attached to a tripod, bridge plate, base plate, dolly, slider, stabilizer, or other mounting system.

A number of embodiments have been described. Nevertheless, it will be understood that various modifications may be made without departing from the spirit and scope of the claims. For example, any of the features (e.g., edges, flanges, grooves, recesses, holes, protrusions, teeth, depressions, etc.) of the release plate 104, the base plate 103, or the receiving plate 105 may dimensions, shapes, numbers, positions, and/ or arrangements different from those of the release plate 104, the base plate 103, and the receiving plate 105.

What is claimed is:

1. A mounting apparatus for releasably securing a device, comprising:
   a first plate made from a metal material, comprising:
      one or more features configured to allow attachment of the device to the first plate, and
      a first lateral edge and a second lateral edge extending at least partially between a front edge and a rear edge of the first plate and extending along a bottom surface of the first plate, each of the first lateral edge and the second lateral edge comprising at least one tooth and at least one depression; and
   a second plate formed to engage the first plate, the second plate having a body made from a metal material, the second plate comprising:
      the body including a third lateral edge and a fourth lateral edge extending at least partially between a front edge and a rear edge of the second plate and extending along a top surface of the second plate, the third and fourth lateral edges each comprising at least one tooth and at least one depression, and the at least one tooth and the at least one depression on each of the third and fourth lateral edges formed to respectively engage the at least one tooth and the at least one depression on each of the first and second lateral edges of the first plate in a manner such that a top surface of the first plate is disposed above the top surface of the second plate,
      the body of the second plate being narrower than the first plate, and the first lateral edge of the first plate extending beyond the third lateral edge of the second plate and the second lateral edge of the first plate extending beyond the fourth lateral edge of the second plate when the first plate and the second plate are engaged,
      a first stopper disposed adjacent the front edge of the body of the second plate,
      a second stopper disposed adjacent the rear edge of the body of the second plate, and
      a third stopper disposed adjacent the rear edge of the body of the second plate, the third stopper configured to move downward into the second plate when the first plate is moved downward to engage the second plate and to extend out of the second plate when the first plate slides forward along the second plate, the third stopper further being movable downward into the body of the second plate for disengaging the first plate from the second plate,
   wherein the first plate further comprises a locking mechanism configured to secure the first plate to the second plate in multiple positions including a position adjacent to the front edge of the second plate,
   wherein the first plate is configured to be engaged with the second plate in a moveable manner such that first plate is configured to be slid relative to the second plate,
   wherein the first plate is configured to be engaged with the second plate in a frontal position, for allowing an end of each of the first and second lateral edges to be respectively aligned with an end of each of the third and fourth lateral edges and for allowing the first stopper to prevent frontal movement of the first plate relative to the second plate,
   wherein the first plate is configured to be engaged with the second plate in a rearward position, for allowing the second stopper to prevent rearward movement of the first plate relative to the second plate, and
   wherein the second stopper is positioned to prevent the first plate from disengaging in a rearward direction from the second plate when the third stopper is moved downward into the second plate.

2. The mounting apparatus of claim 1, wherein the one or more features comprise holes and recesses.

3. The mounting apparatus of claim 1, wherein each of the first lateral edge and the second lateral edge comprises a first plurality of teeth and a first plurality of depressions, and wherein each of the third lateral edge and the fourth lateral edge comprises a second plurality of teeth and a second plurality of depressions.

4. The mounting apparatus of claim 3, wherein in the frontal position, the first plurality of teeth of the first lateral edge and the first plurality of teeth of the second lateral edge are respectively engaged with respective teeth of the second plurality of teeth of the third lateral edge and the second plurality of teeth of the fourth lateral edge, and wherein in the rearward position, the first plurality of teeth of the first lateral edge and the first plurality of teeth of the second lateral edge are respectively aligned with respective depressions of the second plurality of depressions of the third lateral edge and respective depressions of the second plurality of depressions of the fourth lateral edge.

5. The mounting apparatus of claim 1, wherein the first stopper comprises a pin that is fixed in position on the second plate.

6. The mounting apparatus of claim 1, wherein the second stopper comprises a ridge.

7. The mounting apparatus of claim 1, wherein the at least one tooth on each of the first, second, third, and fourth lateral edges is sloped, wherein the at least one tooth of the first lateral edge is sloped so as to engage the at least one tooth of the third lateral edge, and wherein the at least one tooth of the second lateral edge is sloped so as to engage the at least one tooth of the fourth lateral edge.

8. The mounting apparatus of claim 7, wherein the at least one tooth of each of the first and second lateral edges is sloped with respect to a first surface extending between the front and rear edges of the first plate, and wherein the at least one tooth of each of the third and fourth lateral edges is sloped with respect to a second surface extending between the front and rear edges of the second plate.

9. The mounting apparatus of claim 1, wherein the third stopper comprises a spring-loaded pin configured to be pushed in an upward direction by a spring so as to extend substantially perpendicularly from the body of the second plate and to be pushed in a downward direction into the body of the second plate against a bias of the spring.

10. The mounting apparatus of claim 1, wherein the first plate further comprises a frontal groove formed to engage the first stopper of the second plate, and wherein the first plate further comprises a rearward groove formed to engage the second stopper of the second plate.

11. The mounting apparatus of claim 1, wherein the first, second, third, and fourth lateral edges are formed as toothed edges, and the first lateral edge together with the third lateral edge and the second lateral edge together with the fourth lateral edge form a quick-release mechanism.

12. The mounting apparatus of claim 1, wherein the first plate is securable to a dovetail structure.

13. The mounting apparatus of claim 12, wherein the first plate is securable to an Arnold & Richter Cine Technik (ARRI) style dovetail structure.

14. The mounting apparatus of claim 1, further comprising a third plate that is attachable to the second plate, the third plate comprising one or more features that allow the third plate to be attached to an auxiliary structure.

15. The mounting apparatus of claim 1, wherein the mounting apparatus is configured to be releasably secured to a camera, a video recorder, or a sound recorder, and wherein the mounting apparatus is configured to be attached to a tripod, a shoulder rig, a bridge plate, a base plate, a dolly, a slider, or a stabilizer.

16. The mounting apparatus of claim 1, wherein the first plate is configured to be attached to the device when the first plate is disengaged from the second plate and when the first plate is engaged with the second plate.

17. A mounting apparatus for releasably securing a device, comprising:
a first plate means for attaching the device to the mounting apparatus, the first plate means made from a metal material, the first plate means comprising:
a first lateral means and a second lateral means extending at least partially between a frontal portion and a rearward portion of the first plate means and extending along a bottom surface of the first plate means, each of the first lateral means and the second lateral means including at least one tooth and at least one depression; and
a second plate means for engaging the first plate means, the second plate means having a body made from a metal material, the second plate means comprising:
the body including a third lateral means and a fourth lateral means, each of the third lateral means and the fourth lateral means including at least one tooth and at least one depression, the at least one tooth and the at least one depression of each of the third lateral means and the fourth lateral means for respectively engaging the at least one tooth and the at least one depression of each of the first lateral means and the second lateral means of the first plate means, the third and fourth lateral means extending at least partially between a frontal portion and a rearward portion of the second plate means and extending along a top surface of the second plate means in a manner such that a top surface of the first plate means is disposed above the top surface of the second plate means,
the body of the second plate means being narrower than the first plate means such that the first lateral means of the first plate means extends beyond the third lateral means of the second plate means and the second lateral means of the first plate means extends beyond the fourth lateral means of the second plate means when the first plate means and the second plate means are engaged,
a first stopper disposed adjacent the frontal portion of the body of the second plate means,
a second stopper disposed adjacent the rearward portion of the body of the second plate means, and
a third stopper disposed adjacent the rear portion of the body of the second plate means, the third stopper for moving downward into the second plate means when the first plate means is moved downward to engage the second plate means and for extending out of the second plate means when the first plate means slides forward along the second plate means, the third stopper further for moving downward into the body of the second plate means for disengaging the first plate means from the second plate means,
wherein the first plate means further comprises a locking means for securing the first plate means to the second plate means in multiple positions including a position adjacent to the front portion of the second plate means,
wherein the first plate means is for engaging with the second plate means in a frontal position, for allowing an end of each of the first and second lateral means to be respectively aligned with an end of each of the third and fourth lateral means and for allowing the first stopper to prevent frontal movement of the first plate means relative to the second plate means,
wherein the first plate means is for engaging with the second plate means in a rearward position and for allowing the second stopper to prevent rearward movement of the first plate means relative to the second plate means, and
wherein the second stopper is positioned to prevent the first plate means from disengaging in a rearward direction from the second plate means when the third stopper is moved downward into the second plate means.

18. The mounting apparatus of claim 17, wherein each of the first lateral means and the second lateral means comprises a first plurality of teeth and a first plurality of depressions, and wherein each of the third lateral means and the fourth lateral means comprises a second plurality of teeth and a second plurality of depressions.

19. The mounting apparatus of claim 18, wherein in the frontal position, the first plurality of teeth of the first lateral means and the first plurality of teeth of the second lateral means are respectively engaged with respective teeth of the second plurality of teeth of the third lateral means and respective teeth of the second plurality of teeth of the fourth lateral means, and wherein in the rearward position, the first plurality of teeth of the first lateral means and the first plurality of teeth of the second lateral means are respectively aligned with respective depressions of the second plurality of depressions of the third lateral means and respective depressions of the second plurality of depressions of the fourth lateral means.

20. The mounting apparatus of claim 19, wherein each of the first plurality of teeth of the first lateral means and each of the first plurality of teeth of the second lateral means are sloped, wherein each of the second plurality of teeth of third lateral means and each of the second plurality of teeth of the fourth lateral means are sloped, wherein the first plurality of teeth of the first lateral means is sloped so as to engage the second plurality of teeth of the third lateral means, and wherein the first plurality of teeth of the second lateral means is sloped so as to engage the second plurality of teeth of the fourth lateral means.

21. The mounting apparatus of claim 17, wherein the first, second, third, and fourth lateral means are formed as toothed edges, and the first lateral means together with the third lateral means and the second lateral means together with the fourth lateral means form a quick-release mechanism.

22. A mounting apparatus for releasably securing a device, comprising:
a first plate made from a metal material, comprising:
one or more features configured to allow attachment of the device to the first plate when the first plate is disengaged from the second plate and when the first plate is engaged with the second plate, and
a first lateral edge and a second lateral edge extending at least partially between a front edge and a rear edge of the first plate, each of the first lateral edge and the second lateral edge comprising a first plurality of teeth; and
a second plate formed to engage the first plate, the second plate having a body made from a metal material, the second plate comprising:

the body including a third lateral edge and a fourth lateral edge extending at least partially between a front edge and a rear edge of the second plate and formed to respectively engage the first lateral edge of the first plate and the second lateral edge of the first plate, each of the third lateral edge and the fourth lateral edge comprising a second plurality of teeth, a first stopper disposed adjacent the front edge of the body of the second plate, a second stopper disposed adjacent the rear edge of the body of the second plate, and a third stopper disposed adjacent the rear edge of the body of the second plate, the third stopper configured to move downward into the second plate when the first plate is moved downward and engages the second plate and to extend out of the second plate when the first plate slides forward along the second plate, the third stopper further being movable downward into the body of the second plate for disengaging the first plate from the second plate, wherein the first plate further comprises a locking mechanism configured to secure the first plate to the second plate in multiple positions including a position adjacent to the front edge of the second plate, wherein the first plate is configured to be placed atop the second plate in a rearward position, for allowing the first plurality of teeth of the first lateral edge to be respectively disposed adjacent the second plurality of teeth of the third lateral edge, for allowing the first plurality of teeth of the second lateral edge to be respectively disposed adjacent the second plurality of teeth of the fourth lateral edge, and for allowing the second stopper to prevent rearward movement of the first plate relative to the second plate, wherein the first plate is configured to be slid relative to the second plate to a frontal position, for allowing the first plurality of teeth of the first lateral edge to be engaged with the second plurality of teeth of the third lateral edge and the first plurality of teeth of the second lateral edge to be engaged with the second plurality of teeth of the fourth lateral edge, such that the first plate can be secured to the second plate in the frontal position, and for allowing the first stopper to prevent frontal movement of the first plate relative to the second plate, and wherein the second stopper is positioned to prevent the first plate from disengaging in a rearward direction from the second plate when the third stopper is moved downward into the second plate.

23. The mounting apparatus of claim 22, wherein each of the first lateral and the second lateral edge comprises a plurality of first depressions adjacent the plurality of first teeth, and each of the third lateral edge and the fourth lateral edge comprises a plurality of first depressions adjacent the plurality of second teeth.

24. The mounting apparatus of claim 23, wherein the first lateral edge together with the third lateral edge and the second lateral edge together with the fourth lateral edge form a quick-release mechanism.

25. The mounting apparatus of claim 23, wherein the first plate is configured to be placed atop the second plate in the rearward position, for allowing the plurality of first teeth of the first lateral edge to be aligned with the plurality of first teeth second depressions of the third lateral edge.

26. The mounting apparatus of claim 23, wherein the first plate is configured to be slid relative to the second plate to the frontal position, for allowing the plurality of first depressions of the first lateral edge to be aligned with the plurality of second depressions of the third lateral edge.

27. The mounting apparatus of claim 22, wherein each of the first lateral edge and the second lateral edge comprises two first teeth, and each of the third lateral edge and the fourth lateral edge comprises two second teeth.

28. The mounting apparatus of claim 22, wherein the first plate is configured to be slid about 15 mm relative to the second plate to the frontal position, such that the first plate can be secured to the second plate in the frontal position.

29. The mounting apparatus of claim 28, wherein the first plurality of teeth and the second plurality of teeth of the first, second, third, and fourth lateral edges are sloped, wherein the first plurality of teeth of the first lateral edge is sloped so as to engage the second plurality of teeth of the third lateral edge, and wherein the first plurality of teeth of the second lateral edge is sloped so as to engage the second plurality of teeth of the fourth lateral edge.

30. The mounting apparatus of claim 22, wherein the first plurality of teeth is sloped with respect to a first surface extending between the front and rear edges of the first plate, and wherein the second plurality of teeth is sloped with respect to a second surface extending between the front and rear edges of the second plate.

31. The mounting apparatus of claim 22, wherein the first plate is securable to a dovetail structure.

* * * * *

UNITED STATES PATENT AND TRADEMARK OFFICE
CERTIFICATE OF CORRECTION

PATENT NO. : 9,188,274 B2
APPLICATION NO. : 14/218648
DATED : November 17, 2015
INVENTOR(S) : Ryan Reed Schorman It is certified that error appears in the above-identified patent and that said Letters Patent is hereby corrected as shown below:

IN THE CLAIMS

In Claim 35, column 16, lines 15-16, before "second depressions", delete "first teeth".

Signed and Sealed this
Twenty-ninth Day of March, 2016

Michelle K. Lee
*Director of the United States Patent and Trademark Office*